(12) United States Patent
Ausserlechner et al.

(10) Patent No.: US 9,618,365 B2
(45) Date of Patent: Apr. 11, 2017

(54) ANGLE SENSOR SYSTEM HAVING A MAGNETIC SENSOR

(71) Applicant: Infineon Technologies AG, Neubiberg (DE)

(72) Inventors: Udo Ausserlechner, Villach (AT); Mario Motz, Wernberg (AT)

(73) Assignee: Infineon Technologies AG, Neubiberg (DE)

( * ) Notice: Subject to any disclaimer, the term of this patent is extended or adjusted under 35 U.S.C. 154(b) by 262 days.

(21) Appl. No.: 14/474,715

(22) Filed: Sep. 2, 2014

(65) Prior Publication Data
US 2016/0061630 A1 Mar. 3, 2016

(51) Int. Cl.
*G01D 5/16* (2006.01)
*G01D 5/14* (2006.01)

(52) U.S. Cl.
CPC .................... *G01D 5/145* (2013.01)

(58) Field of Classification Search
CPC .. G01R 33/077; G01R 33/0029; G01R 33/07; G01R 33/075; G01R 33/0023; G01R 33/0035; G01R 33/007; G01R 33/0082; G01R 33/066; G01D 5/145; G01D 18/004; G01D 5/147; G01D 5/24438; G06F 3/0346; G06F 3/046; G06F 3/038; G05B 15/02; H02P 29/0066
See application file for complete search history.

(56) References Cited

U.S. PATENT DOCUMENTS

| | | | | |
|---|---|---|---|---|
| 7,319,320 | B2* | 1/2008 | Kawashima | G01D 5/145 324/207.22 |
| 8,519,700 | B2* | 8/2013 | Jerance | G01D 5/145 324/207.12 |
| 9,267,781 | B2* | 2/2016 | Ausserlechner | G01B 7/30 |
| 9,354,084 | B2* | 5/2016 | Ausserlechner | G01D 3/08 |
| 2011/0175600 | A1 | 7/2011 | Jerance et al. | |
| 2012/0161755 | A1 | 6/2012 | Masson et al. | |
| 2013/0264915 | A1* | 10/2013 | Suzuki | B62D 5/0484 310/68 B |

* cited by examiner

*Primary Examiner* — Vinh Nguyen
(74) *Attorney, Agent, or Firm* — Eschweiler & Potashnik, LLC

(57) ABSTRACT

An angle sensor device includes first and second magnet tracks, a sensor component, and a control unit. The first and second magnet tracks are fixed to a rotatable object and are configured to generate a non-homogenous field. The rotatable object is configured to rotate about a rotation axis and the non-homogenous field has a smaller gradient of magnitude along a rotational direction than a perpendicular direction, which is perpendicular to the rotational direction. The sensor component is positioned off-axis and is configured to measure a magnetic field including the non-homogenous field and provide magnetic field measurements. The control unit is configured to determine angular information from the magnetic field measurements.

21 Claims, 9 Drawing Sheets

ANGLE SENSOR SYSTEM HAVING A MAGNETIC SENSOR

BACKGROUND

Sensors are utilized in sensing systems to detect properties, such as light, temperature, motion, and the like. One type of sensor commonly used is an angle sensor based on magnetic fields. The angle sensor measures a magnetic field and calculates an angle based on the field measurement.

A common type of angle sensor is an on-axis sensor, which is axially aligned with a rotating object, such as a motor shaft. Another type of angle sensor is an off-axis sensor, which is not axially aligned with the object or shaft. Instead, the off-axis sensor is located off the axis of the rotating object.

Off-axis sensors are particularly convenient for situations where they cannot be placed only an axis. However, these sensors can face challenges in obtaining accurate measurements.

DETAILED DESCRIPTION

Figure 1:
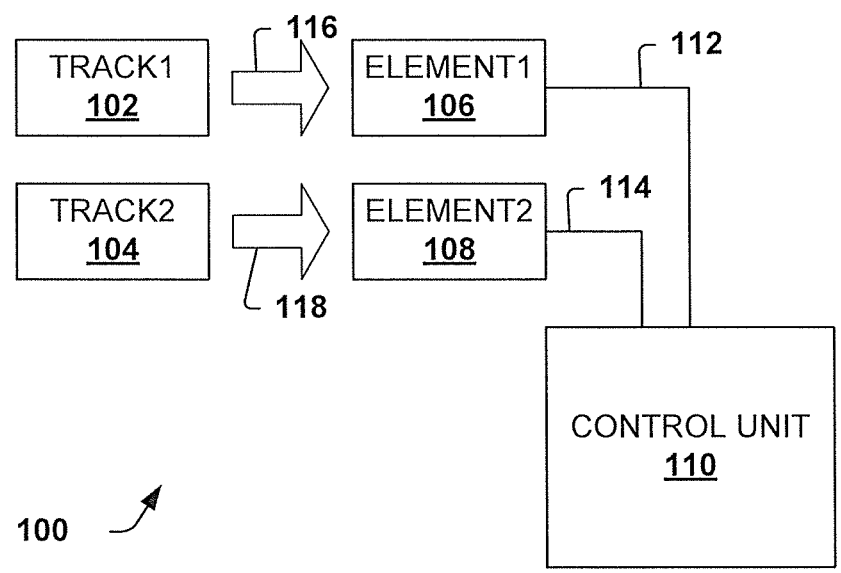
FIG. 1 is a diagram of an off-axis angle sensor system that operates using multiple generated magnetic fields.

The present invention will now be described with reference to the attached drawing figures, wherein like reference numerals are used to refer to like elements throughout, and wherein the illustrated structures and devices are not necessarily drawn to scale.

Devices, systems and methods are disclosed that facilitate angle sensors and mitigate disturbances in magnetic fields. Harsh environments, such as automotive systems, have a variety of components and conditions that impact electronics, sensors, and magnetic fields. These disturbances can result in faulty measurements, sensor failures, and the like.

FIG. 1 is a diagram of an off-axis angle sensor system 100 that operates using multiple generated magnetic fields. The system 100 is provided in a simplified form in order to facilitate understanding. The system 100 can be utilized in harsh environments, automotive systems, vehicle systems, and the like. The system 100 can be fabricated into one or more devices.

The system 100 includes a first magnet track 102, a second magnet track 104, a first sensor element 106, a second sensor element 108 and a control unit 110. The sensor elements 106 and 108 measure fields generated by the first and second magnet tracks 102 and 104, referred to as the useful field. The useful field conveys rotational information. However, the sensor elements 106 and 108 also measure other magnet fields present, referred to as disturbance fields. Typically, disturbance fields can mitigate the accuracy and operation of the magnetic sensors that measure useful fields. However, using the multiple magnet tracks, such as 102 and 104. The magnet tracks are arranged to increase the field gradients in an axial direction, which is necessarily different than a rotational direction. As a result, the multiple magnet tracks enhance the useful fields and mitigate the impact of the disturbance fields.

The magnet tracks 102 and 104 are fixedly attached to a rotatable object. As a result, the magnet tracks 102 and 104 rotate with the rotatable object along a rotational direction or direction of movement. Thus, the tracks 102 and 104 are in a fixed relative position with respect to each other/one versus the other. Typically, the rotatable object is relatively large, such as 20 mm and the magnet tracks 102 and 104 are even larger, such as 30 mm, because they have to encircle the rotatable object. The magnet tracks 102 and 104 move synchronously upon rotations with the rotatable object. The rotatable object can be a shaft, motor shaft, cam shaft, crank shaft, injection control, and the like.

The magnet tracks 102 have a suitable shape or form, including flat or curved surfaces of a solid disc. In magnetostatic theory, the magnetic field of such a bulk magnet is computed by equivalent magnetic charges located on its surfaces. In the context of this patent application we consider surfaces bearing equivalent magnetic charges as magnet tracks. The magnet tracks are elongated and encircle the rotation axis. They are typically, but not necessarily ring shaped. Physically the magnet tracks 102 and 104 can comprise a solid magnetic material (e.g. sintered or pressed magnet powder), strips or stripes of magnetic material (e.g., plastic bonded stripes), a surface of a magnet, and the like. In one example, plastic bonded stripes of magnetic material are attached to a soft magnetic, hard metal material. Thereby "soft magnetic" means that the material has a large relative permeability (typically larger than 500) such that it can be magnetized even by weak externally applied magnetic fields (of e.g. 80 A/m) and which are demagnetized upon removal of this external magnetic field. This is in contrast to hard magnetic material, that is magnetized only by large externally applied magnetic fields (typically in excess of 80 kA/m) and which keeps its magnetization upon removal of this external magnetic field. The magnet tracks comprise hard magnetic material. The terms "soft magnetic" and "hard magnetic" are not necessarily related to mechanical properties such as "soft" and "hard".

The tracks 102 and 104 have a relatively large perimeter/circumference and corresponding relatively large diameter and have relatively small widths. In one example, the width of each track is less than about 25 mm. The magnet tracks 102 and 104 are substantially circular and surround the rotatable object. The tracks 102 and 104 can be positioned adjacent each other or spaced apart by a gap. In one example, the gap is less than about 10 mm wide. The gap can be configured so that detected magnetic field components are stable versus small position tolerances of the elements 106 and 108. In some cases a minimum gap is required in order to provide a selected magnetization, such as a required high quality of magnetization.

The first track 102 and the second track 104 are located on a curved surface, in one example. The curved surface can be comprised of a metal and can be an outer surface of a drum or a cylinder. In another example, the first track 102 and the second track 104 are located on a flat surface encircling the rotation axis.

The first track 102 and the second track 104 are configured to have varied magnetization or magnetic properties. Generally, the magnetization of the tracks 102 and 104 vary in sign, magnitude, or direction, yet in special cases they may have the same magnetic polarity (north and south), but have different magnitude values. In one example, the first track 102 has a relatively strong north pole and the second track 104 has a relatively weak north pole. As a result, the first track 102 and the second track 104 have varied field gradients in a normal or tangential direction. However, along the elongated direction of the tracks 102 and 104 (direction of movement) the field gradient is smaller than the direction perpendicular to it. This is due to the fact that the length of each track around the rotation axis is longer than the distance between the two tracks. Hence, the two tracks establish a new property of the magnetic field pattern, namely the enhanced field gradient in at least one of the two mutually orthogonal directions perpendicular to the track length, and this new property can be used for an off-axis angle sensor and elements 106 and 108. In one example, the first and second tracks 102 and 104 have a mirror symmetry to a center plane. In another example, the first and second tracks 102 and 104 have a complementary magnetization, such that magnetic north poles of the first track 102 correspond to magnetic south poles of the second track 104 and magnetic south poles of the first track 102 correspond to magnetic north poles of the second track 104.

The magnetic fields generated by the tracks 102 and 104 are represented in FIG. 1 as first field or field gradient 116 and second field or field gradient 118. The variation of intensity of the field or field gradient is typically sinusoidal and can be achieved by varying track features such as width, thickness or gap between the tracks 102 and 104. An example of a field generated has a magnitude, such as 100 Gauss, in a direction wherein a field gradient includes an intensity or magnitude change per distance, such as 1000 Gauss per millimeter. Additionally, the intensity can be varied by varying an amount of soft magnetic material nearby. For example, the tracks can be attached to a soft magnetic steel backing, which acts as a magnetic mirror thereby increasing the magnetic field generated by the tracks 102 and 104. Thus, in one example, a steel back is perforated to dilute is magnetic mirroring effect and facilitate varying the field intensity. The variation of intensity may also be achieved by varying the direction of magnetization with respect to a surface normal of the magnet track, as is done e.g. in the diametrically magnetized ring magnet of FIG. 6. Some examples of modifying magnetic fields generated by magnet tracks are discussed below.

The magnet tracks 102 and 104 may be configured to be diametric with regards to magnetization. Additionally, the tracks 102 and 104 are configured to have a single pole or multiple poles, yet they generally have the same number of poles. The magnet track 102 generates the first magnetic field 116 and the magnet track 104 generates the second magnetic field 118. As described above, the first and second fields vary such that there is a difference between them. In one example, the first and second fields are sinusoidal and vary by a phase shift.

The first element 106 and the second element 108 measure magnetic fields in their proximity to obtain first measurements 112 and second measurements 114. The first and second elements 106 and 108 are separated by a relatively small distance. However, the distance is sufficient so that the first measurements 112 and the second measurements 114 can be used to determine angular information about the rotatable object. The first and second elements 106 and 108 measure magnetic fields in two (2D) or three (3D) directions. The directions include radially, axially, and tangential. Alternately, the measured directions can include simple x, y and z coordinates.

The first element 106 is closer to the first track 102 and, as a result, is more impacted by the field 116. Similarly, the second element 108 is closer to the second track 104 and is more impacted by the field 118. However, both elements measure both fields 116 and 118, also referred to as the useful fields. It is appreciated that disturbance fields that may be present are typically homogenous. Thus, the disturbance fields are about equal at each sensor element. As a result, the difference between the measurements 112 and 114 substantially removes or filters out the disturbance field(s).

The first measurements 112 and the second measurements 114 are utilized by the control unit 110 to filter disturbance field(s) and determine angular information about the rotatable object. The angular information includes angular position, direction of rotation, speed of rotation (rotations per minute), and the like. The angular information can be obtained with suitable accuracy even with relatively large magnetic disturbance fields, such as fields of up to 10 milli-tesla.

FIG. 1 is shown with two magnet tracks 102 and 104, however it is appreciated that additional magnet tracks can also be used. The additional tracks can provide even greater variations in intensity for the magnetic fields.

Additionally, the sensor elements 106 and 108 can be located on a single die or on separate dies, but within a same package. Additionally, the control unit 110 can be on a die with the elements 106 and 108 and/or within the same package.

Figure 2:
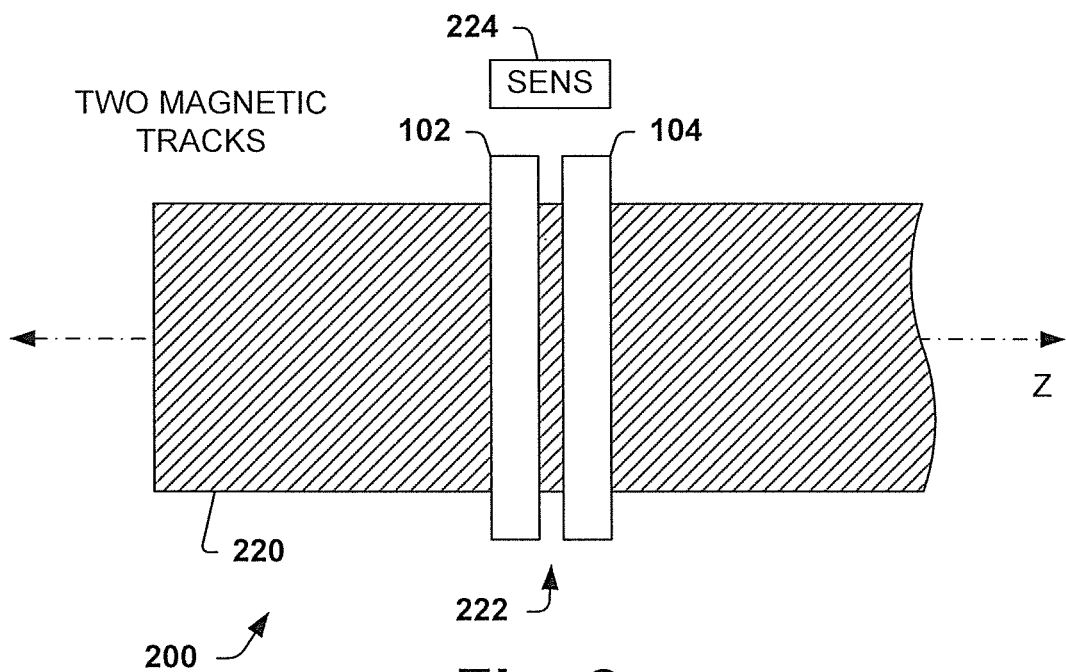
FIG. 2 is a diagram illustrating an off-axis angle sensor system that uses two generated magnetic fields.

FIG. 2 is a diagram illustrating an off-axis angle sensor system 200 that uses two generated magnetic fields. The system 200 shown in FIG. 2 uses two magnet tracks to generate two fields having varied field gradients. The system 200 can be utilized in harsh environments, automotive systems, vehicle systems, and the like. The system 200 can be fabricated into one or more devices.

The system 200 includes a sensor component 224, a first magnet track 102 and a second magnet track 104. The first magnet track 102 and the second magnet track 104 are also described above with regard to FIG. 1. The system 200 determines angular information about a shaft 220, which is a rotatable object.

The shaft 220 is comprised of a suitable material, such as hard metal, steel, and the like. The shaft 220 rotates or moves about an axis shown as z, also referred to as an axial direction. The shaft 220 can be connected to or part of a motor, engine, valve, steering wheel, wheel, cam shaft, injection control and the like. Typically, the shaft 220 is relatively large, such as 20 mm or larger.

The sensor component 224 is positioned off the z-axis, and is thus referred to as an off-axis sensor component and includes multiple sensor elements, such as the elements 106 and 108 described above. The elements are magneto sensitive elements, such as magneto resistive elements, that measure surrounding magnetic fields in two (2D) or three (3D) directions/dimensions.

The sensor elements are spaced apart from each other by a relatively small axial distance. This placement is selected so that each element is subject to a varied magnetic field from the other. By using the multiple magnet tracks 102 and 104 that provide gradient fields, the placement can be smaller than with other systems. Typically, the sensor elements are parallel to the z-axis. Thus, the combination of the fields generated by the tracks 102 and 104 and seen by the sensor elements has a gradient field in that it changes in magnitude over a relatively small distance. Thus, in one example, the combination field changes within a millimeter or two.

The magnet tracks 102 and 104 in this example are in a ring shape and formed/located on a curved surface, such as a surface of the shaft 220. There is a gap 222 between the tracks 102 and 104. The gap 222 can range from 0 to a suitable value, such as 5 mm. The magnet tracks 102 and 104 typically have about the same outer diameter and circumference. However, their width (axial direction), thickness (radial direction) and composition is varied so that generated magnetic field intensity is varied.

The sensor component 224 measures a magnetic field, which includes a useful magnetic field and a disturbance magnetic field. The useful magnetic field is the gradient magnetic field generated by the magnet tracks 102 and 104. The disturbance magnetic field results from other components, such as other motors, current flowing through wires, and the like. The magnetic field measurements convey angular information about the shaft 220 including, but not limited to, rotations per minute (angular speed), angular position, direction of rotation, and the like. A control unit or other component can distinguish the gradient magnetic field from the disturbance magnetic field in order to enhance accuracy.

Figure 3:
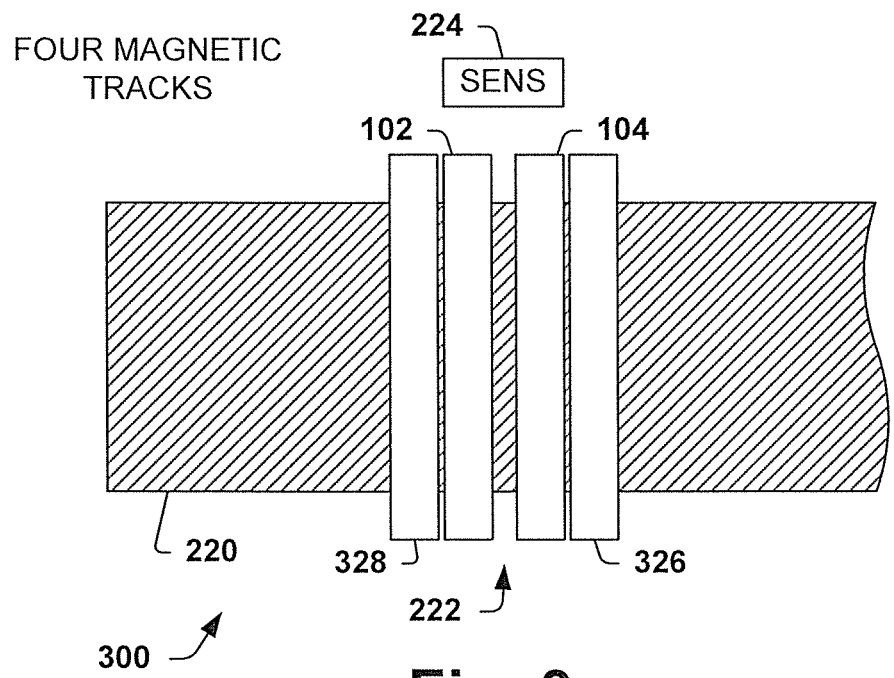
FIG. 3 is a diagram illustrating an off-axis angle sensor system that uses four generated magnetic fields.

FIG. 3 is a diagram illustrating an off-axis angle sensor system 300 that uses four generated magnetic fields. The system 300 shown in FIG. 3 uses four magnet tracks to generate four fields having varied field gradients. The system 300 can be utilized in harsh environments, automotive systems, vehicle systems, and the like. The system 300 can be fabricated into one or more devices.

The system 300 is similar to the system 200, described above and like numbered components can be referenced above for additional description. The system 300 determines angular information about a rotatable object, shaft 220. The system 300 includes a sensor component 224, a first magnet track 102, a second magnet track 104, a first supplemental magnet track 328 and a second supplemental track 326.

The supplemental tracks 328 and 326 can be configured to vary a combined field generated by the tracks 102, 104, 328, and 326. The supplemental tracks 328 and 326 can be configured to homogenize the combined field. Thus, if the sensor elements vary from selected values due to assembly tolerance, its distance to one of the tracks 102 and 104 increases while its distance to the other decreases. If both magnet tracks 102 and 104 produce identical or substantially similar field patterns, the combined field varies less than the field from each of the magnet tracks. This can mitigate angle measurement errors due to position tolerances of the sensor elements.

Alternatively, the supplemental tracks 328 and 326 can be configured to generate varied magnetic field patterns in order to further increase the magnetic field gradient of the combined field. For example, one of the supplemental tracks 328 and 326 may generate a field proportional to a sine of the rotation angle of the shaft 220 while the other may generate a field proportional to a cosine of the rotational angle. In one example, the supplemental magnet tracks 328 and 326 are configured to generate varied magnetic field patterns by using varied stripes of magnetic material.

Figure 4:
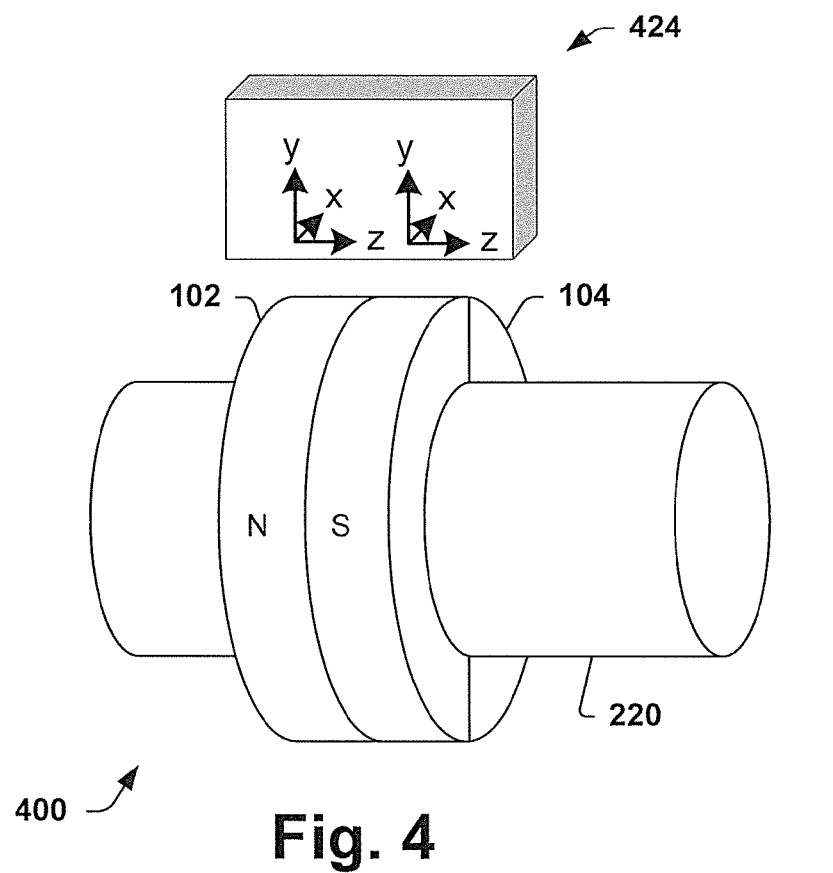
FIG. 4 is a diagram illustrating an off-axis angle sensor system that uses multiple magnet tracks and an orthogonal sensor die.

FIG. 4 is a diagram illustrating an off-axis angle sensor system 400 that uses multiple magnet tracks and an orthogonal sensor die. The system uses the multiple magnet tracks to generate a magnetic field gradient that varies at small distances. The system 400 can be fabricated into one or more devices.

The system 400 is similar to the system 200 described above. Like numbered components can be referenced above for additional description. The system 400 includes a rotatable shaft 220, a first magnet track 102, a second magnet track 104 and a sensor die 424. The system 400 is described with reference to x, y and z directions as shown in FIG. 4.

The rotatable shaft 220 rotates about an axis along the z direction, also referred to as the axial direction. The first magnet track 102 is a ring magnet that surrounds a portion of the rotatable shaft 220. The second magnet track 104 is also a ring magnet that surrounds a portion of the rotatable shaft 220. The magnet tracks 102 and 104 are diametrically magnetized, have similar magnetic polarities, but have varied magnitude or intensity.

The sensor package 424 includes first and second sensor elements configured to measure the field in 3 dimensions, the x, y and z directions (components Bx, By, and Bz). The elements are spaced apart by an amount in the axial or z direction. The elements are formed on one or more sensor dies. The sensor package 424 is configured to be in an orthogonal direction and lies in a y, z plane.

Figure 5:
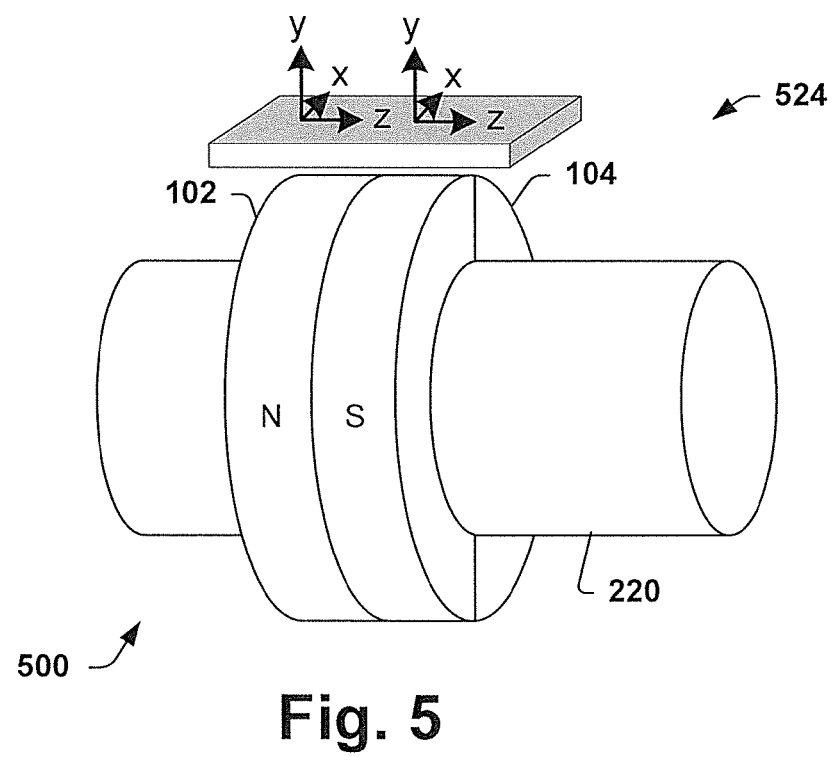
FIG. 5 is a diagram illustrating an off-axis angle sensor system that uses multiple magnet tracks and a tangential sensor package.

FIG. 5 is a diagram illustrating an off-axis angle sensor system 500 that uses multiple magnet tracks and a tangential sensor package. The system 500 uses the multiple magnet tracks to generate a magnetic field gradient that varies at small distances. The system 500 can be fabricated into one or more devices.

The system 500 is similar to the system 200 described above. Like numbered components can be referenced above for additional description. The system 500 includes a rotatable shaft 220, a first magnet track 102, a second magnet track 104 and a sensor die 524. The system 500 is described with reference to x, y and z directions as shown in FIG. 5.

The rotatable shaft 220 rotates about an axis along the z direction, also referred to as the axial direction. The first magnet track 102 is a ring magnet that surrounds a portion of the rotatable shaft 220. The second magnet track 104 is also a ring magnet that surrounds a portion of the rotatable shaft 220. The magnet tracks 102 and 104 are diametrically magnetized, have similar magnetic polarities, but have varied magnitude or intensity.

The sensor package 524 includes first and second sensor elements configured to measure in 3 dimensions, the x, y and z directions (components Bx, By, and Bz). The elements are spaced apart by an amount in the axial and/or radial direction. The sensor package 424 is configured to be in an tangential direction and lies in a x, z plane.

It is appreciated that the sensor die or package can be configured in other angles or directions, including planes between the y, z plane and the x, z plane.

The measured magnetic components in the x, y, z directions (3D) are referred to as orthonormal components and designated Bx, By, and Bz. These components can be used to calculate magnitudes of the magnetic field seen at each sensor element. For example, the magnitude B of the magnetic field is given by $B=sqrt(Bx^2+By^2+Bz^2)$. Then, an angle is determined by, for example Bz/B with Bx=B*sin (polar angle)*cos(azimuthal angle) and By=B*sin(polar angle)*sin(azimuthal angle).

In an example for 2D sensor elements, the elements detects in at least one point of projection of a magnetic field vector onto a plane, such as an (x,y) plane of a right handed Cartesian coordinate system. Then, the elements 106 and 108 can detect Bx and By magnetic field components or detect $Bxy=sqrt(Bx^2+By^2)$. Then, an angle within this plane is defined by cos(angle)=Bx/Bxy and sin(angle)=By/Bxy. Thus, other elements that detect only an angle are not used.

Figure 6:
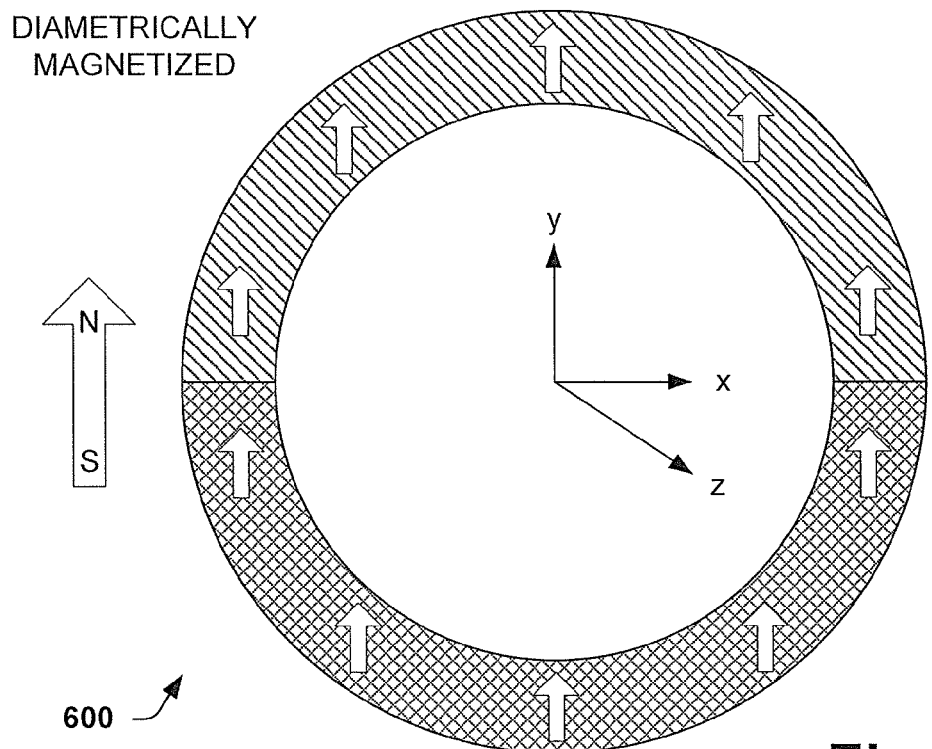
FIG. 6 is a diagram of a magnet track that can be used in the above sensor systems.

FIG. 6 is a diagram of a magnet track 600 that can be used in the above sensor systems. The magnet track 600 is provided as an example and it is appreciated other configurations can be utilized.

The magnet track 600 is a ring magnet and is centered about a rotation axis, shown as z in this example. The magnet track 600 is configured about an x, y plane. Additionally, the magnet track 600 is diametrically magnetized with a north pole in a y direction and a south pole in an opposite, (−y), direction. Being diametrically magnetized means that the magnetization is generally aligned to a single direction perpendicular to the rotation axis. Magnetic north poles are located on an upper portion of the magnet track 600. Magnetic south poles are located on a lower portion of the magnet track 600. Individual field arrows are shown indicating the polarity of the magnet track 600.

It is appreciated that magnetization directions throughout the track 600 are generally parallel, but variations can be present due to limitations of the magnet material, magnetization procedures, demagnetization effects and the like. Typically, such variations or deviations are less than +/−10 degrees. It is also appreciated that similar magnetization can be achieved using other shapes and/or configurations include a solid magnet.

The magnet track 600 generates a sinusoidal magnetic field, in that the magnetic field components vary sinusoidally at a location when the magnet track 600 is rotated about the axis of rotation. By having two magnet tracks, such as tracks 102 and 104 generating sinusoidally magnetic fields varied by a phase shift, angular information can be determined by comparing measurements of both fields. In one example, the phase shift is 90 degrees, however other phase shifts can be utilized.

Figure 7:
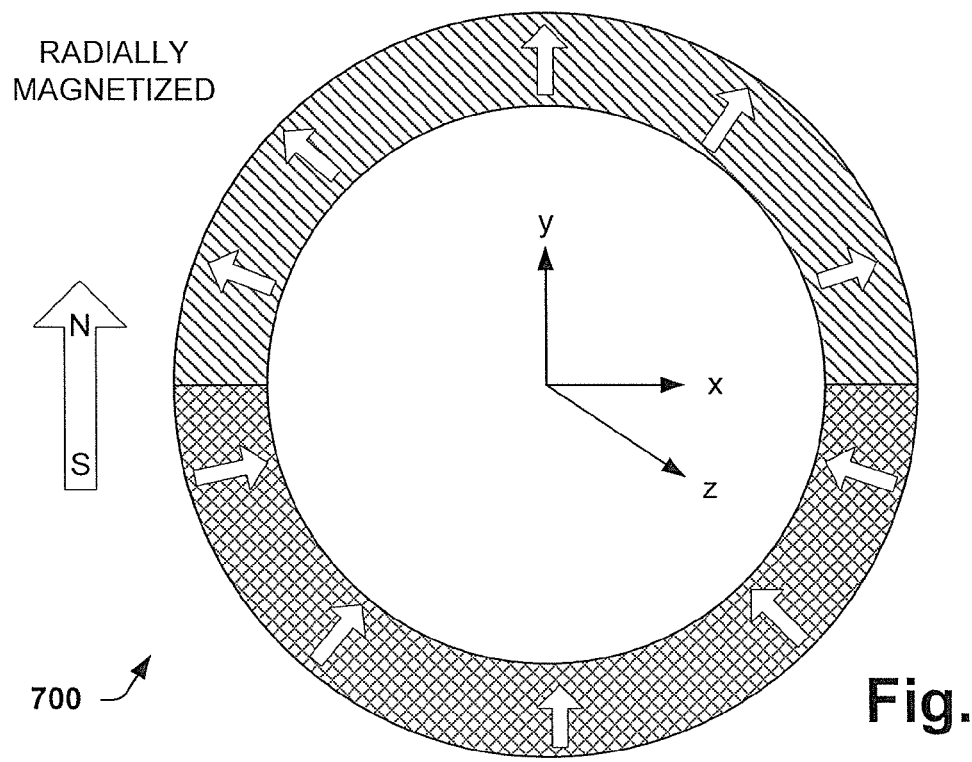
FIG. 7 is a diagram of a radially magnetized magnet track that can be used in the above sensor systems.

FIG. 7 is a diagram of a radially magnetized magnet track 700 that can be used in the above sensor systems. The magnet track 700 is provided as an example and it is appreciated other configurations can be utilized.

The magnet track 700 is again shaped as a ring magnet and is centered about an axial direction, shown as z in this example. However, it is appreciated other shapes can be used.

The magnet track 700 is radially magnetized, thus its magnetization is essentially aligned to the radial direction, which is a direction extending from the center outward. An upper portion of the magnet track 700 has a magnetization that points outwards while a lower portion of the magnet track 700 has a magnetization that points inwards.

When rotated, the magnet track 700 does not generate a sinusoidal magnetic field. Instead, the field components versus time have a rectangular or triangular pulse shape when the track is rotated at a relatively constant speed. However, overshoot conditions can occur near zero transitions of the rectangular pulses and flattened zero transitions of triangular pulses.

The track 700 can be formed using relatively low cost material, for example, by using thin strips in a radial direction to that the track comprises think stripes (e.g., 1 mm) of plastic bonded magnetic material. Alternatively the track 700 can be formed using bulk magnetic material like sintered hard ferrites or rare earth materials. The lack of a generated sinusoidal field can be problematic for determining angle between two or more radial generated fields from two or more radially magnetized magnet tracks.

Figure 8:
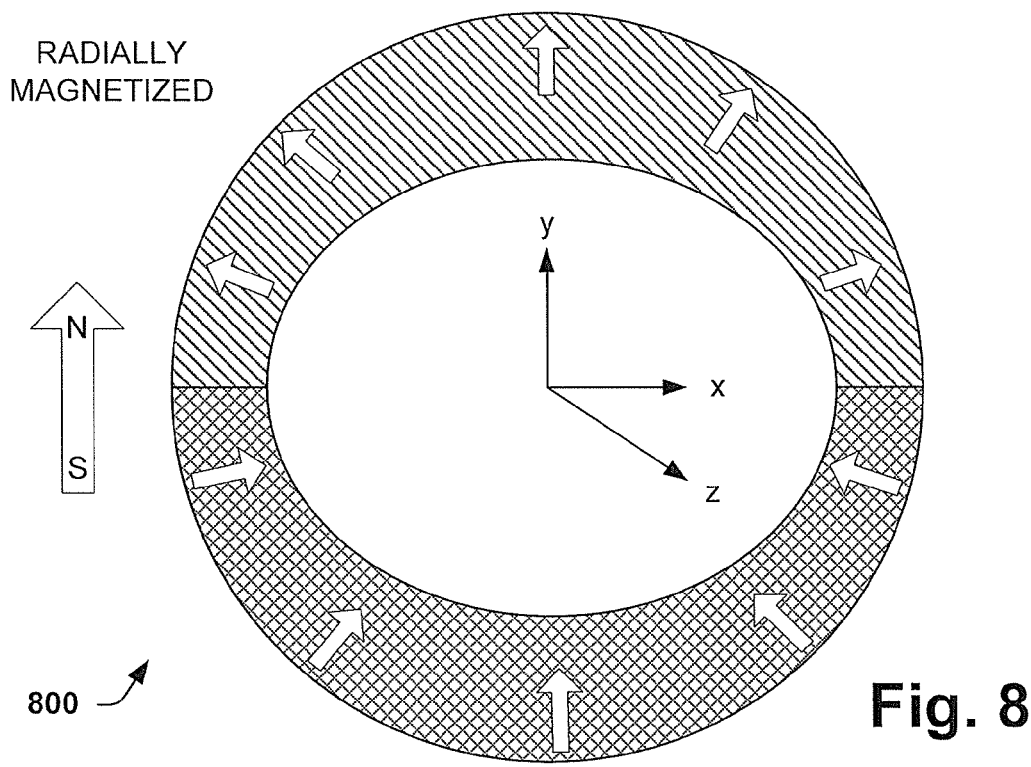
FIG. 8 is a diagram of a non homogenous radially magnetized magnet track that can be used in the above sensor systems.

FIG. 8 is a diagram of a non homogenous radially magnetized magnet track 800 that can be used in the above sensor systems. The magnet track 800 is provided as an example and it is appreciated that other configurations can be utilized.

The magnet track 800 is radially magnetized with a magnetic material, similar to that of the track 700 described above. However, the thickness of the ring of the track 800 is varied or non-homogenous. As a result, the magnetic field is typically stronger where the ring is thicker and weaker where the ring is thinner.

The magnet track 800 is shown with an outer perimeter having a circular shape and an inner perimeter having an elliptical shape. It is noted that other variations are contemplated, including an outer perimeter with an elliptical shape and an inner perimeter with a circular shape and an outer perimeter with an elliptical shape and an inner perimeter with an elliptical shape. As a result of the elliptical shape, a sinusoidal magnetic field is generated by rotation of the magnet track 800. Thus, multiple sinusoidal magnetic fields are generated by multiple magnet tracks, which facilitate determining angular information of a rotatable object.

Figure 9:
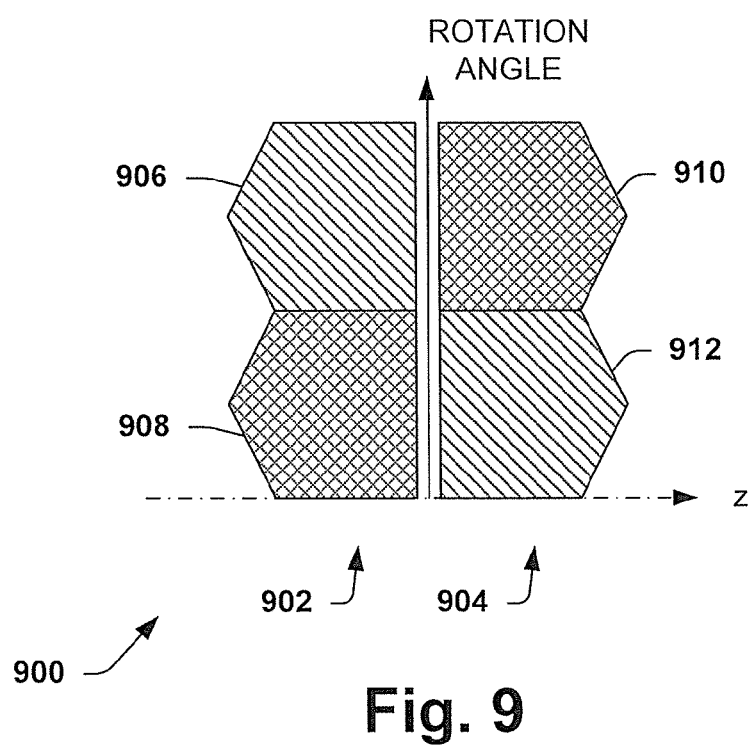
FIG. 9 is a diagram illustrating a rectified view of magnet tracks having magnetic stripes applied to an outer surface of a drum/base layer.

FIG. 9 is a diagram illustrating a rectified view of magnet tracks 900 having magnetic stripes applied to an outer surface of a drum/base layer. Only a portion of the tracks 900 are shown in order to illustrate the configuration of the geometric shape of the tracks.

The magnet tracks 900 include a first track 902 and a second track 904. The first track 902 includes an radially inward magnetization portion/strip 908 and a radially outward magnetization portion/strip 906. The second track 904 has a similar but varied configuration. The second track 904 includes a radially outward magnetization portion/strip 912 and a radially inward magnetization portion/strip 910 on the outward magnetization portion 912. Typically, the magnetization of the second track is complementary to the one of the first track.

The left border of the first track 902 is shown having an angled geometry, which alters the shape of the generated magnetic field. The right border of the second track 904 is also shown having an angled geometry to alter the shape of the generated magnetic field. Thus, the geometry is altered along the tracks in order to vary the intensity of the magnetic field generated therefrom. In one example, the geometry is altered so that the first track 902 and the second track 904 generated sinusoidal magnetic fields separated by a phase shift.

Figure 10:
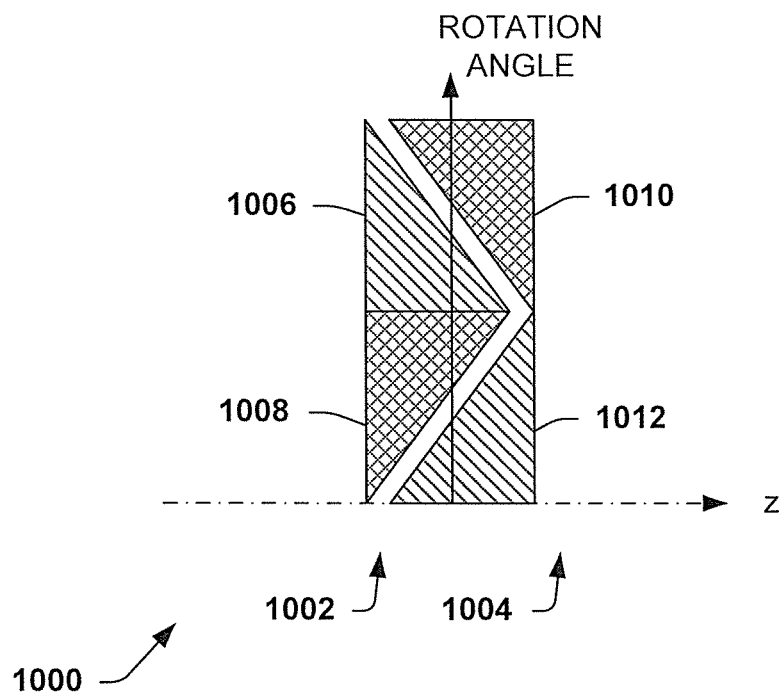
FIG. 10 is another diagram illustrating a rectified view of magnet tracks having magnetic stripes applied to an outer surface of a drum/base layer.

FIG. 10 is another diagram illustrating a rectified view of magnet tracks 1000 having magnetic stripes applied to an outer surface of a drum/base layer. Only a portion of the tracks 1000 are shown in order to illustrate the configuration of the geometric shape of the tracks.

The magnet tracks 1000 include a first track 1002 and a second track 1004. The first track 1002 includes an radially inward magnetization portion/strip 1008 and a radially outward magnetization portion/strip 1006. The second track 1004 has a similar but varied configuration. The second track 1004 includes a radially outward magnetization portion/strip 1012 and a radially inward magnetization portion/strip 1010 on the outward magnetization portion 1012.

The first track 1002 is shown having a triangular configuration. Similarly, the second track 1004 is also shown having an opposite, but triangular configuration. The size of the triangle shape or configuration is varied to vary the intensity of the generated magnetic field.

Figure 11:
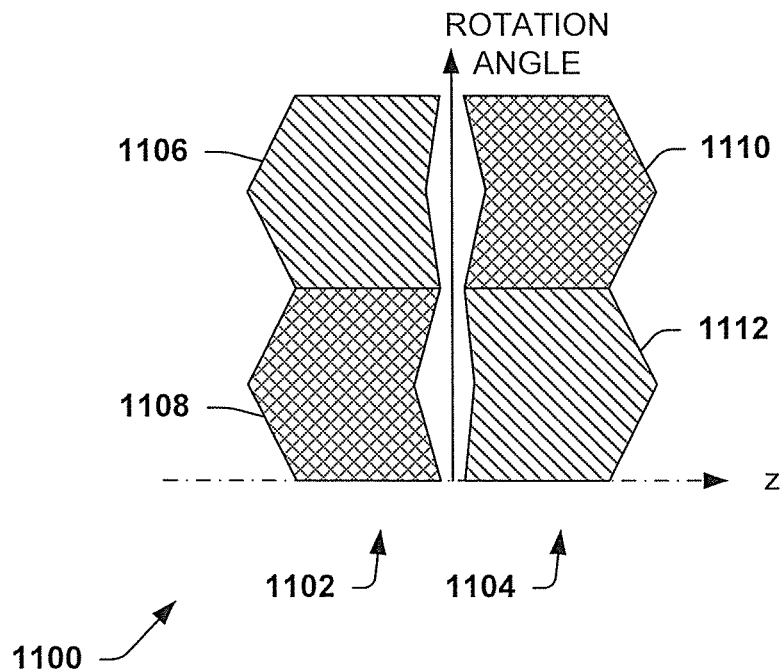
FIG. 11 is another diagram illustrating a rectified view of magnet tracks having magnetic stripes applied to an outer surface of a drum/base layer.

FIG. 11 is another diagram illustrating a rectified view of magnet tracks 1100 having magnetic stripes applied to an outer surface of a drum/base layer. Only a portion of the tracks 1100 are shown in order to illustrate the configuration of the geometric shape of the tracks.

The magnet tracks 1100 include a first track 1102 and a second track 1104. The first track 1102 includes a radially inward magnetization portion/strip 1108 and a radially outward magnetization portion/strip 1106. The second track 1104 has a similar but varied configuration. The second track 1104 includes a radially outward magnetization portion/strip 1112 and a radially inward magnetization portion/strip 1110 on the outward magnetization portion 1112.

The left border of the first track 1102 is shown having an angled geometry, which alters the shape of the generated magnetic field. A right border of the first track 1102 also has an angled geometry as shown.

The right border of the second track 1104 is shown having an angled geometry to alter the shape of the generated magnetic field. Similarly, its left border also has an angled geometry.

The angled geometry for right and left borders is varied or altered along the tracks in order to vary the intensity of the magnetic field generated therefrom. In one example, the geometry is altered so that the first track 1102 and the second track 1104 generated sinusoidal magnetic fields separated by a phase shift.

Additionally, the tracks can be configured in other suitable ways to yield sinusoidal fields upon rotation. In one example, the field is modified by forming holes in a carrier late onto which magnetic material is formed. Thus, at locations where holes are present, the intensity of the magnetic field is less and locations without holes mirror the magnetic field yielding a greater intensity.

In another example, the magnet tracks include a first ring shaped track formed over a second ring shaped track. The tracks have equal width and thickness, the variations of in the geometry, such as shown in the above figures, is used to vary the magnetic field intensity.

Figure 12:
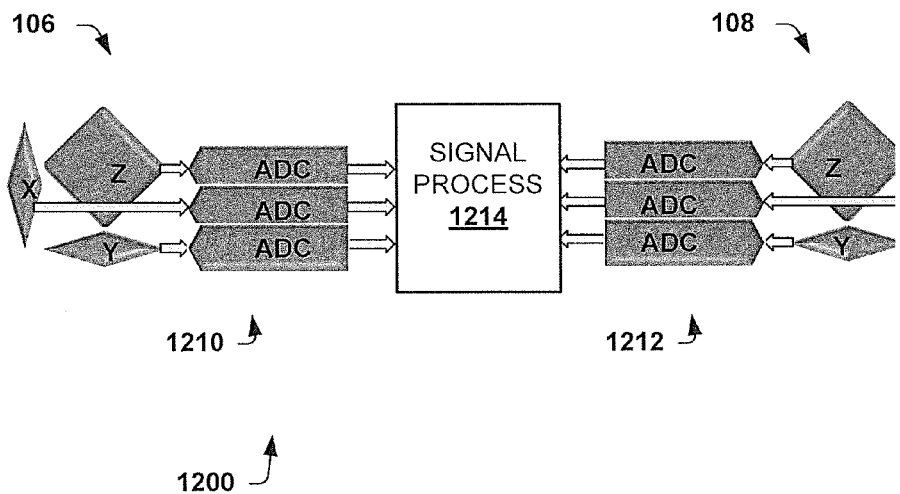
FIG. 12 is a circuit diagram of a control circuit for multiple generated magnetic fields.

FIG. 12 is a circuit diagram of a control circuit 1200 for multiple generated magnetic fields. The control circuit 1200 can be used in or with the control unit 110 of FIG. 1. The control circuit 1200 obtains or measures magnetic field components in a plurality of directions at first and second locations to determine angular information based on the measured components using differential processing.

The circuit 1200 includes a first sensor element 106, a second sensor element 108, a first analog to digital converter (ADC) 1210, a second ADC 1212, and a signal processing unit 1214. The first sensor element 106 is configured to provide first magnetic field components in x, y, z directions designated Bx1, By1, and Bz1, respectively at a first location. The second sensor element 108 is configured to provide first magnetic field components in x, y, z directions designated Bx2, By2, and Bz2, respectively at a second location. The x, y, and z directions are described above with regards to FIGS. 4, 5 and elsewhere. The first location and the second location are separated by an amount in the z direction, which is also parallel to the axis of rotation.

The measured components from the elements 106 and 108 are analog. The first ADC 1210 converts the first components Bx1, By1, and Bz1 into digital form and the second ADC 1212 converts the second components Bx2, By2, and Bz2 into digital form.

The signal processing unit 1214 receives the first and second components in digital form. The processing unit 1214 processes the components to generate differential signals based on the components. The differential signals include Bx1-Bx2, By1-By2 and Bz1-Bz2. The differential signals and/or components are used to determine angular information about a rotatable object.

Figure 13:
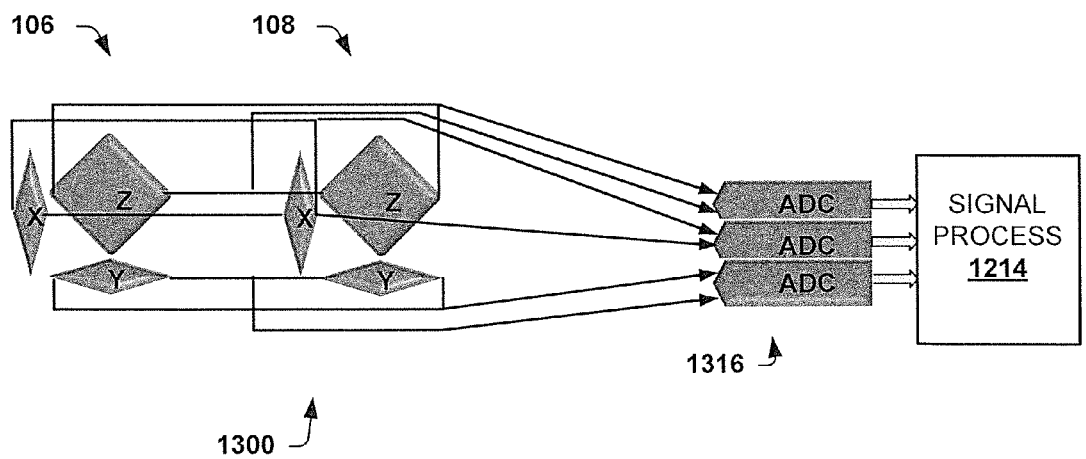
FIG. 13 is another circuit diagram of a control circuit for multiple generated magnetic fields using a single analog to digital converter.

FIG. 13 is another circuit diagram of a control circuit 1300 for multiple generated magnetic fields using a single analog to digital converter. The control circuit 1300 can be used in or with the control unit 110 of FIG. 1. The control circuit 1300 obtains or measures magnetic field components in a plurality of directions at first and second locations to determine angular information based on the measured components using differential processing.

The circuit 1300 includes a first sensor element 106, a second sensor element 108, an analog to digital converter (ADC) 1316, and a signal processing unit 1214. The first sensor element 106 is configured to provide first magnetic field components in x, y, z directions designated Bx1, By1, and Bz1, respectively at a first location. The second sensor element 108 is configured to provide first magnetic field components in x, y, z directions designated Bx2, By2, and Bz2, respectively at a second location. The x, y, and z directions are described above with regards to FIGS. 4, 5 and elsewhere. The first location and the second location are separated by an amount in the z direction, which is also parallel to the axis of rotation.

The measured components from the elements 106 and 108 are analog. The components are subtracted from each other prior to the ADC. The ADC 1316 receives analog differential signals/components from the elements 106 and 108 and provides digital differential signals/components therefrom. The received components include Bx1-Bx2, By1-By2 and Bz1-Bz2. As a result, the circuit 1300 can handle larger homogenous disturbance fields than the circuit 1200 because the disturbance fields are removed prior to the ADC. It is noted that a homogenous disturbance field is a magnetic field that is substantially equal at the first and second locations.

The signal processing unit 1214 receives the differential components in digital form and performs additional processing, including determining angular information about a rotatable object. The angular information is determined based on the differential components.

Figure 14:
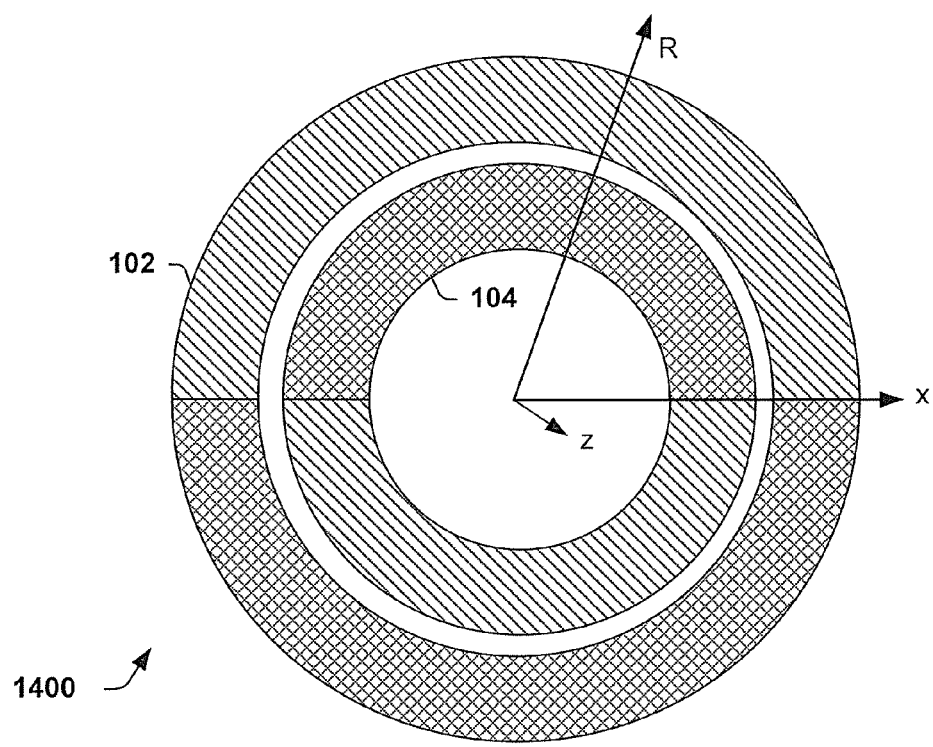
FIG. 14 is a diagram of a radial arrangement of magnet tracks that can be used in the above sensor systems.

FIG. 14 is a diagram of a radial arrangement 1400 of magnet tracks that can be used in the above sensor systems. The arrangement 1400 is provided as an example and it is appreciated other configurations can be utilized. The arrangement 1400 provides the tracks arranged on a plane of a radial direction R instead of tracks arranged in parallel, as shown above.

The arrangement includes a first track 102 and a second track 104, which are centered about a rotation axis z. The tracks 102 and 104 can be located on a plane or flat surface encircling the rotation axis z. The first track 102 and the second track 104 are shown as being substantially circular, however other shapes are contemplated. The first track 102 has an inner surface having a larger perimeter than an outer surface of the second track 104. As a result, the first track 102 substantially surrounds the second track 104. Additionally, there can be a gap or space between the inner surface of the first track 102 and the outer surface of the second track 104, as shown in FIG. 14.

The magnet tracks 102 and 104 are magnetized diametrically in one example and radially in another. Additionally, track features, width, thickness, borders, and the like of the tracks 102 and 104 can be varied or selected to generate a gradient field.

Figure 15:
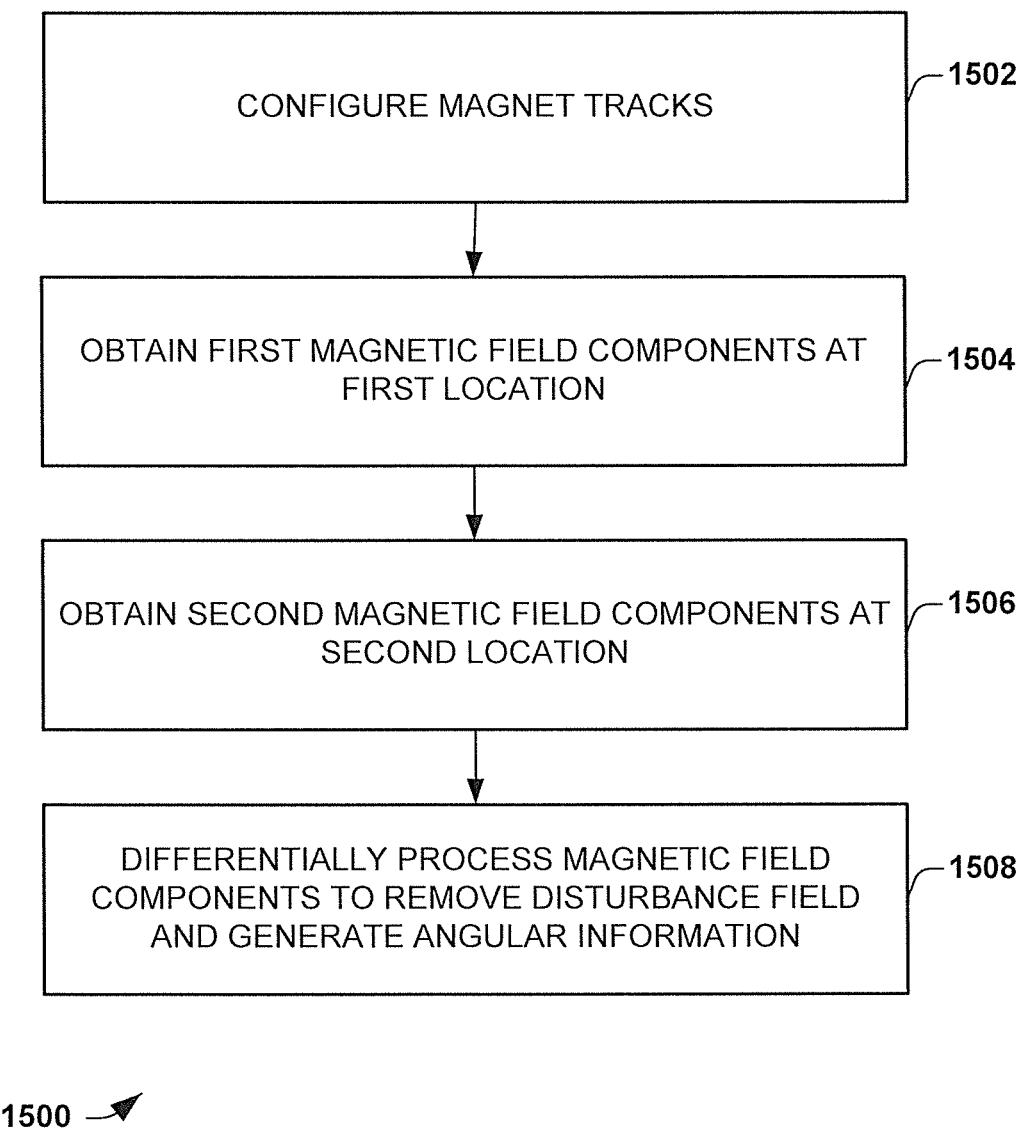
FIG. 15 is a flow diagram illustrating a method of operating an off-axis magnetic sensor device.

FIG. 15 is a flow diagram illustrating a method 1500 of operating an off-axis magnetic sensor device. The method 1500 uses multiple magnet tracks affixed to a rotatable object to generate a non-homogenous field that can be accurately measured even in the presence of relatively large disturbance fields.

The method begins at block 1502, where first and second magnet tracks are configured. The first and second magnet tracks are configured to generate a combined field that is non-homogenous, in that its magnetic field intensity varies with rotational position of the first and second magnet tracks. In one example, the first and second magnet tracks generate sinusoidal magnetic fields varied by a phase shift. Some examples of suitable magnet tracks are provided above.

First magnetic field components are obtained at a first location off axis from the rotatable object at block 1504. The field components can include orthonormal components (3D), such as Bx, By, and Bz. Alternately, the field components can include radial and tangential components (2D). A sensor or sensor element obtains the first magnetic field components.

Second magnetic field components are obtained at a second location also off axis from the rotatable object at block 1506. The second location is spaced axially from the first location by an amount. The field components can include orthonormal components or radial and tangential components. A second sensor element obtains the second magnetic field components. The amount of axial spacing between the first sensor element and the second sensor element is relatively small, such as less than about 2 mm.

The first and second magnetic field components are differentially processed to remove or filter a disturbance field and generate angular information for the rotatable object at block 1508. In one example, the field components are subtracted from each other in order to filter out any disturbance fields present. In another example, first and second magnetic field magnitudes are calculated for the first and second locations. Then the first and second magnetic field magnitudes are used to differentially remove the disturbance field and to generate the angular information.

While the method and variations thereof are illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

It is appreciated that the claimed subject matter may be implemented as a method, apparatus, or article of manufacture using standard programming and/or engineering techniques to produce software, firmware, hardware, or any combination thereof to control a computer to implement the disclosed subject matter (e.g., the systems/devices shown in FIGS. 1, 2, etc., are non-limiting examples of system that may be used to implement the above methods). The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

An angle sensor device includes first and second magnet tracks, a sensor component, and a control unit. The first and second magnet tracks are fixed to a rotatable object and are configured to generate a non-homogenous field. The rotatable object is configured to rotate about a rotation axis and the non-homogenous field has a smaller gradient of magnitude along a rotational direction than a perpendicular direction, which is perpendicular to the rotational direction. The sensor component is positioned off-axis and is configured to measure a magnetic field including the non-homogenous field and provide magnetic field measurements. The control unit is configured to determine angular information from the magnetic field measurements.

A signal processing circuit includes a first sensor element, a second sensor element, an analog to digital component and a differential signal processing unit. The first sensor element is configured to provide first magnetic field components for a first location. The second sensor element is configured to provide second magnetic field components for a second location. The analog to digital component is configured to generate first and second digital magnetic field components from the first and second magnetic field components. The differential signal processing unit is configured to filter a disturbance field from the first and second digital components.

A method of operating an off-axis magnetic sensor is disclosed. First and second magnet tracks are configured about or around a rotatable object to generate a non-homogenous magnetic field upon rotation. First magnetic field components are obtained at a first location, which is off-axis from the rotatable object. Second magnetic field components are obtained at a second location, which is also off-axis from the rotatable object. The second location is spaced axially from the first location by an amount. The first and second magnetic field component are differentially processed to remove a disturbance field and to generate angular information for the rotatable object.

In regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. An angle sensor device comprising:
   first and second magnet tracks fixed to a rotatable object, wherein the first magnet track is configured to generate a first magnetic field and the second magnet track is configured to generate a second magnetic field, wherein the first magnet track has magnetic properties different than the second magnet track and the first magnetic field is different than the second magnetic field, the first magnetic field and the second magnetic field combine to form a combined magnetic field, wherein the rotatable object is configured to rotate about a rotation axis and the combined magnetic field has a smaller gradient of magnitude along a rotational direction than in a perpendicular direction, which is perpendicular to the rotational direction;
   a sensor component positioned off-axis and configured to measure a magnetic field including the combined magnetic field and a disturbance field and provide magnetic field measurements based on the magnetic field; and
   a control unit configured to determine angular information from the magnetic field measurements.

2. The device of claim 1, wherein the control unit is configured to filter at least a portion of the disturbance field from the magnetic field measurements to determine the angular information.

3. The device of claim 1, wherein the first and second magnet comprise a material selected from the group comprising permanent magnet material and soft magnetic material.

4. The device of claim 1, wherein the second magnet track is adjacent the first magnet track.

5. The device of claim 1, wherein a gap exists between the second magnet track and the first magnet track, wherein the gap is configured to provide stable detected magnetic field components.

6. The device of claim 1, wherein the first and second magnets are located on a surface encircling the rotation axis, wherein the surface is one of a curved surface and a flat surface.

7. The device of claim 1, wherein the first and second magnet tracks have a mirror symmetry to a center plane.

8. The device of claim 1, wherein the first and second magnet tracks have a complementary magnetization pattern wherein magnetic north poles of the first magnet track correspond to magnetic south poles of the second magnet track and magnetic south poles of the first magnet track correspond to magnetic north poles of the second magnet track.

9. The device of claim 1, wherein the first magnet track generates a sinusoidal magnetic field upon rotation on the sensor component.

10. The device of claim 1, wherein the first magnet track encircles the rotation axis.

11. The device of claim 1, wherein the sensor component comprises a first sensor element and a second sensor element separated by a relatively small amount in an axial direction.

12. The device of claim 1, wherein the control unit includes a signal processing circuit configured to substantially remove the disturbance field from the magnetic field measurements, wherein the signal processing circuit includes an analog to digital converter configured to generate digital magnetic components from the provided magnetic field measurements, wherein the disturbance field is generated by one or more components that do not include the first and second magnetic tracks.

13. The device of claim 1, wherein the control unit determines a first magnetic field value at a first location and a second magnetic field value at a second location, wherein the first location and the second location are within a package and spaced by an amount in an axial and/or radial direction.

14. The device of claim 1, wherein the first magnet track includes a first portion and a second portion and has a generally circular outer perimeter, the first portion has a first direction of magnetization; and the second portion has a second direction of magnetization.

15. The device of claim 14, wherein the first direction of magnetization is opposite the second direction of magnetization.

16. A signal processing circuit comprising:
   first and second magnet tracks fixed to a rotatable object and configured to generate a combined field, wherein the combined field includes a first field generated by the first magnet track and a second field generated by the second magnet track, wherein the first field is different than the second field, wherein the rotatable object is configured to rotate about a rotation axis and the and second magnet tracks are arranged to generate the combined field with a smaller gradient of magnitude along a rotational direction than in a perpendicular direction, which is perpendicular to the rotational direction;
   a first sensor element configured to provide values of first magnetic field components based on the combined field for a first location;
   a second sensor element configured to provide values of second magnetic field components based on the combined field for a second location, the second location at a gap distance from the first location;
   an analog to digital converter configured to generate values of first and second digital magnetic field components from the values of first and second magnetic field components; and
   a differential signal processing unit configured to filter a disturbance field from the first and second digital components.

17. The circuit of claim 16, wherein the first sensor element is one of a group of a magneto resistive element, a Hall plate, and a Vertical Hall effect device.

18. The circuit of claim 16, wherein the differential signal processing unit is further configured to generate angular information according to the first and second field components for the rotatable object.

19. A method of operating an off-axis magnetic sensor, the method comprising:
   configuring first and second magnet tracks about a rotatable object to generate a combined magnetic field upon rotation, wherein the combined magnetic field includes a smaller gradient of magnitude along a direction of movement than a perpendicular direction, which is perpendicular to the direction of movement and the combined magnetic field is based on a first field and a second field, where the first field is different than the second field;
   obtaining first magnetic field components at a first location off axis from the rotatable object;

obtaining second magnetic field components at a second location off axis from the rotatable object, wherein the second location is spaced from the first location by an amount; and differentially processing the first and second magnetic field components to remove a disturbance field and to generate angular information for the rotatable object.

20. The method of claim 19, wherein configuring the first and second magnet tracks includes varying track features comprising at least one from a group comprising track width, track thickness and spacing between the first and second magnet tracks.

21. The method of claim 20, wherein the amount is in at least one of an axial direction and a radial direction.

* * * * *